(12) United States Patent
Gutierrez

(10) Patent No.: US 11,642,921 B1
(45) Date of Patent: May 9, 2023

(54) TIRE REPAIR TOOL

(71) Applicant: Rafael Gutierrez, N. Augusta, SC (US)

(72) Inventor: Rafael Gutierrez, N. Augusta, SC (US)

( * ) Notice: Subject to any disclaimer, the term of this patent is extended or adjusted under 35 U.S.C. 154(b) by 509 days.

(21) Appl. No.: 16/827,836

(22) Filed: Mar. 24, 2020

(51) Int. Cl.
| | |
|---|---|
| *B29C 73/08* | (2006.01) |
| *B60C 25/00* | (2006.01) |
| *B25B 21/00* | (2006.01) |
| *B29C 73/06* | (2006.01) |
| *B29L 30/00* | (2006.01) |
| *B25B 23/00* | (2006.01) |

(52) U.S. Cl.
CPC ............ *B60C 25/16* (2013.01); *B25B 21/002* (2013.01); *B29C 73/06* (2013.01); *B29C 73/08* (2013.01); *B25B 23/0007* (2013.01); *B29L 2030/00* (2013.01)

(58) Field of Classification Search
CPC ... B60C 25/16; B25B 21/002; B25B 23/0007; B29C 73/06; B29C 73/08; B29L 2030/00
See application file for complete search history.

(56) References Cited

U.S. PATENT DOCUMENTS

| | | | | |
|---|---|---|---|---|
| 2,920,515 A | * | 1/1960 | Mays | ...................... B29C 73/08 |
| | | | | 152/370 |
| D203,768 S | | 2/1966 | Nakis | |
| 3,785,896 A | * | 1/1974 | Kassel | ..................... B29C 73/08 |
| | | | | 156/97 |
| 7,051,622 B1 | | 5/2006 | Chen | |
| 7,377,197 B1 | | 5/2008 | Lin | |
| 7,757,585 B2 | | 7/2010 | Brazeau | |
| 7,832,308 B2 | | 11/2010 | Wang | |
| 9,067,368 B2 | | 6/2015 | Kerner | |
| 2008/0127425 A1 | * | 6/2008 | Chen | ....................... B29C 73/08 |
| | | | | 81/57.44 |
| 2009/0260487 A1 | * | 10/2009 | Wang | ...................... B29C 73/08 |
| | | | | 156/97 |

* cited by examiner

*Primary Examiner* — Timothy P. Kelly

(74) *Attorney, Agent, or Firm* — Kyle A. Fletcher, Esq.

(57) ABSTRACT

The tire repair tool is used for repairing a damaged tire. The tire repair tool plugs the damaged tire. The tire repair tool is configured for use with an impact wrench. The impact wrench is a pneumatic device that drives the working element of the tire repair tool into the damaged tire such that the tire repair tool can deposit a plug in an aperture formed through the damaged tire. The tire repair tool comprises a needle structure, a stop collar, and a locking nut. The stop collar and the locking nut attach to the needle structure. The needle structure forms the working element of the tire repair tool that inserts the plug into the damaged tire. The stop collar limits the depth of insertion of the tire repair tool into the damaged tire. The locking nut fixes the position of the stop collar relative to the needle structure.

17 Claims, 3 Drawing Sheets

TIRE REPAIR TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of vehicles and vehicle tires, more specifically, a tool for repairing damaged tires.

SUMMARY OF INVENTION

The tire repair tool is configured for use with the damaged tire of a vehicle. The tire repair tool is a tool. The tire repair tool is used for repairing the damaged tire. Specifically, the tire repair tool plugs the damaged tire. The tire repair tool is configured for use with an impact wrench. The impact wrench is a pneumatic device that drives the working element of the tire repair tool into the damaged tire such that the tire repair tool can deposit a plug in an aperture formed through the damaged tire. The tire repair tool comprises a needle structure, a stop collar, and a locking nut. The stop collar and the locking nut attach to the needle structure. The needle structure forms the working element of the tire repair tool that inserts the plug into the damaged tire. The stop collar limits the depth of insertion of the tire repair tool into the damaged tire. The locking nut fixes the position of the stop collar relative to the needle structure.

These together with additional objects, features and advantages of the tire repair tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the tire repair tool in detail, it is to be understood that the tire repair tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tire repair tool.

It is therefore important that the claims be regarded as including such equivalent construction insofar as they do not depart from the spirit and scope of the tire repair tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
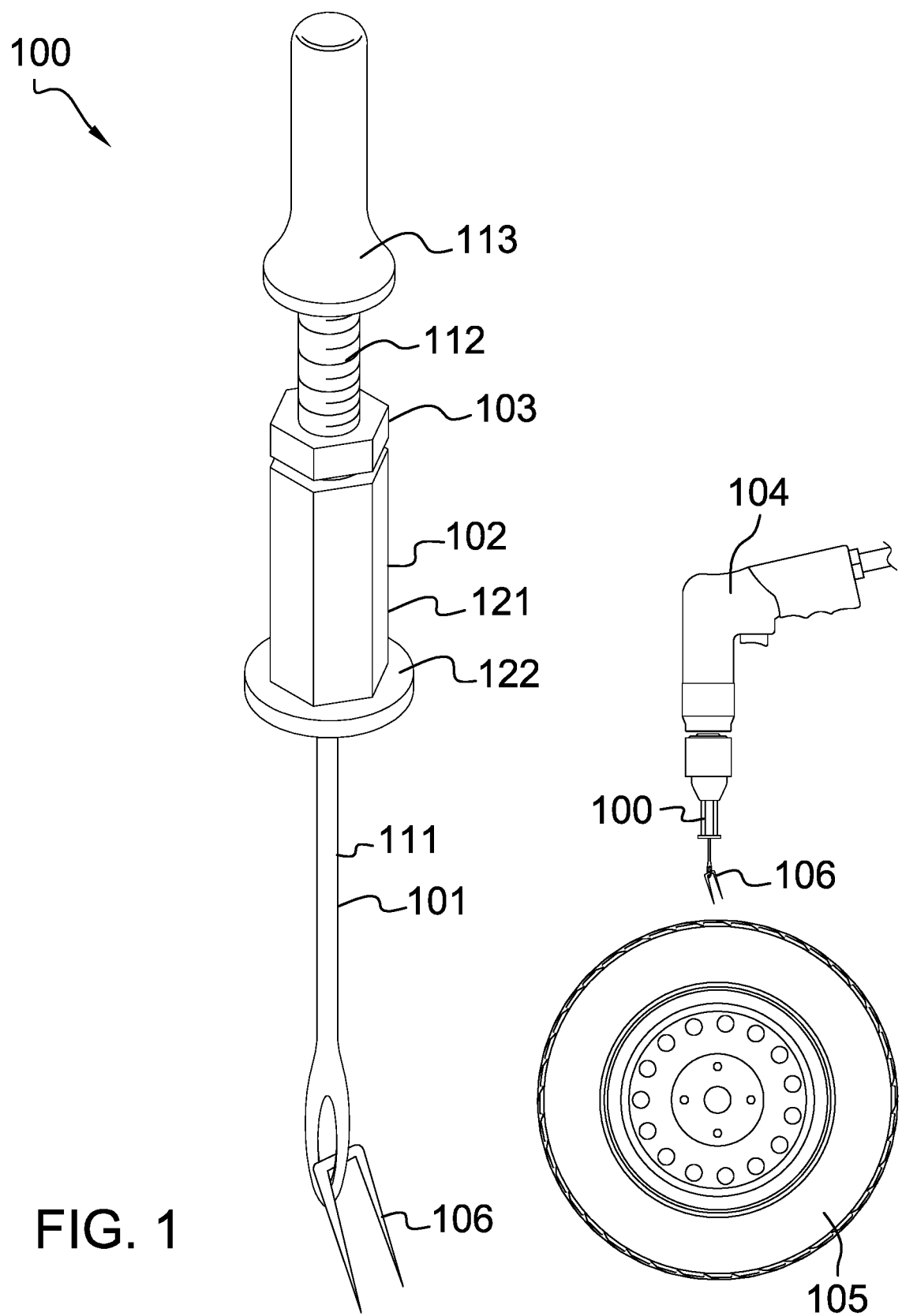
FIG. 1 is a perspective view of an embodiment of the disclosure.
Figure 2:
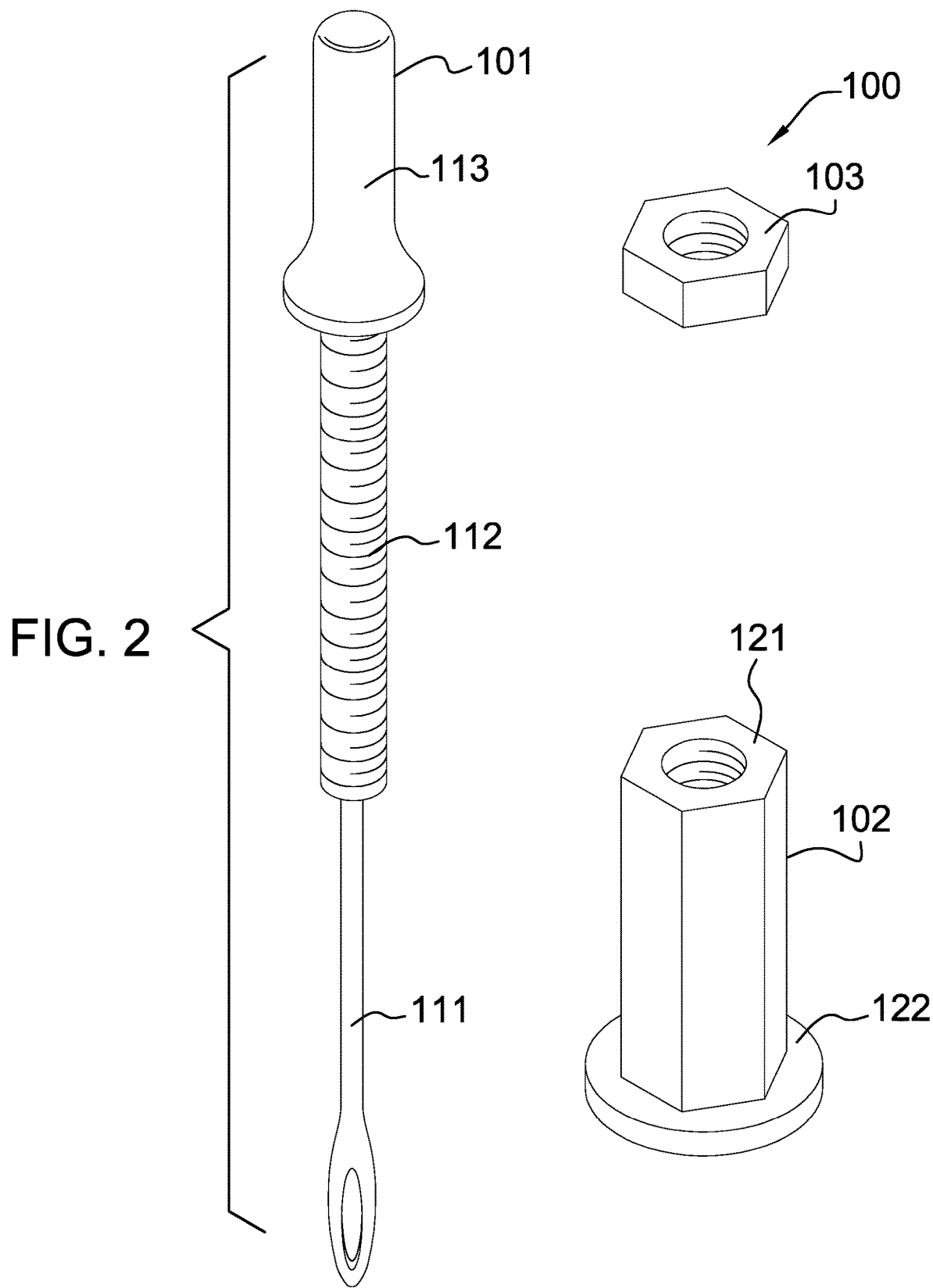
FIG. 2 is an exploded view of an embodiment of the disclosure.
Figure 3:
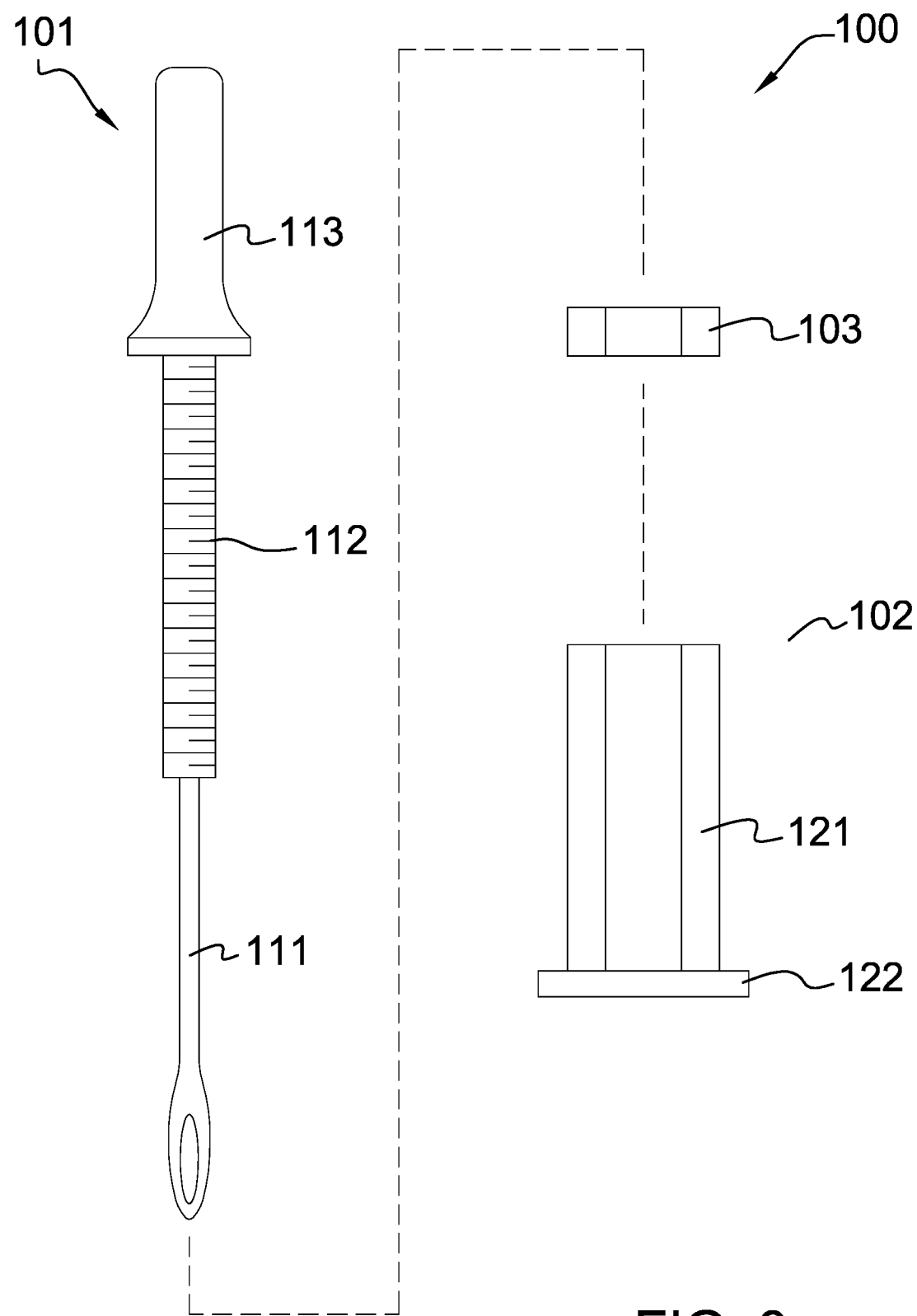
FIG. 3 is a side view of an embodiment of the disclosure.

Detailed reference will now be made to one or more potential embodiments of the disclosure, which are illustrated in FIGS. 1 through 3.

The tire repair tool 100 (hereinafter invention) is configured for use with the damaged tire 105 of a vehicle. The invention 100 is a tool. The invention 100 is used for repairing the damaged tire 105. Specifically, the invention 100 plugs the damaged tire 105. The invention 100 is configured for use with an impact wrench 104. The impact wrench 104 is a pneumatic device that drives the working element of the invention 100 into the damaged tire 105 such that the invention 100 can deposit a plug 106 in an aperture formed through the damaged tire 105.

The invention 100 comprises a needle structure 101, a stop collar 102, and a locking nut 103. The stop collar 102 and the locking nut 103 attach to the needle structure 101. The needle structure 101 forms the working element of the invention 100 that inserts the plug 106 into the damaged tire 105. The stop collar 102 limits the depth of insertion of the invention 100 into the damaged tire 105. The locking nut 103 fixes the position of the stop collar 102 relative to the needle structure 101.

The impact wrench 104 is defined elsewhere in this disclosure. The damaged tire 105 is a tire that has been punctured in some manner. The damaged tire 105 is repaired by the invention 100. The tire is defined elsewhere in this disclosure. The plug 106 is a flexible structure that is coated in an elastomeric material. The plug 106 is compressed as it is inserted into the puncture of a damaged tire 105. As the plug 106 returns to its relaxed shape, the plug 106 form as gas impermeable seal across the puncture such that the damaged tire 105 becomes repaired.

The needle structure 101 is a mechanical structure. The needle structure 101 has a composite prism structure. The needle structure 101 installs a plug 106 into the damaged tire 105. The needle structure 101 attaches to the impact wrench 104 such that the impact wrench 104 drives the needle structure 101 with the plug 106 into the damaged tire 105. The design of the needle structure 101 leaves the plug 106 in the damaged tire 105 when the needle structure 101 is removed from the damaged tire 105. The needle structure 101 comprises a plug 106 needle 111, a locking bolt 112, and a wrench bit 113.

The plug 106 needle 111 is a mechanical device. The primary shape of the plug 106 needle 111 forms a prism-shaped structured. The plug 106 needle 111 is formed with a loop structure on one of the congruent ends of the prism structure of the plug 106 needle 111. The loop formed in the plug 106 needle 111 is sized to receive the plug 106. The plug 106 needle 111 forms the working element of the needle structure 101. The plug 106 needle 111 forms the leading element of the needle structure 101. By leading element is meant that the plug 106 needle 111 leads the balance of the needle structure 101 into the damaged tire 105 when the needle structure 101 inserts the plug 106 into the damaged tire 105. The plug 106 needle 111 leaves the plug 106 in the damaged tire 105 as the plug 106 needle 111 is removed from the damaged tire 105.

The locking bolt 112 is a prism-shaped structure. The locking bolt 112 is formed as a bolt. The bolt is defined elsewhere in this disclosure. The congruent end of the plug 106 needle 111 that is distal from the loop attaches to the locking bolt 112 to form a composite prism structure. The outer dimension of the locking bolt 112 is lesser than the outer dimension of the locking bolt 112. The locking bolt 112 is formed with an exterior screw thread.

The outer dimension of the locking bolt 112 is lesser than the inner dimension of the locking nut 103 such that the locking bolt 112 will insert into the locking nut 103. The exterior screw thread of the locking bolt 112 is sized such that the locking nut 103 will screw on to the locking bolt 112 to form a threaded connection. The outer dimension of the locking bolt 112 is lesser than the inner dimension of the stop nut 121 of the stop collar 102 such that the locking bolt 112 will insert into the stop nut 121 of the stop collar 102. The exterior screw thread of the locking bolt 112 is sized such that the stop nut 121 of the stop collar 102 will screw on to the locking bolt 112 to form a threaded connection.

The wrench bit 113 is a prism-shaped structure. The congruent end of the locking bolt 112 that is distal from the plug 106 needle 111 attaches to a congruent end of the prism structure of the wrench bit 113 to form a composite prism structure. The wrench bit 113 physically attaches the needle structure 101 to the impact wrench 104 such that the impact wrench 104 will force the plug 106 needle 111 into the damaged tire 105.

The stop collar 102 is a mechanical structure. The stop collar 102 has a composite prism structure. The stop collar 102 has a tubular structure. The stop collar 102 has a nut structure. The stop collar 102 attaches to the needle structure 101 using a threaded connection. The stop collar 102 attaches to the needle structure 101 to form a composite prism structure. The stop collar 102 forms a barrier that limits the depth of insertion of the needle structure 101 into the damaged tire 105. The position of the stop collar 102 relative to the needle structure 101 is adjustable. The position of the stop collar 102 on the needle structure 101 controls the depth of insertion of the needle structure 101 into the damaged tire 105. Specifically, the stop collar 102 forms a barrier that prevents the further insertion of the needle structure 101 into the damaged tire 105. The stop collar 102 comprises a stop nut 121 and a stop flange 122.

The stop nut 121 is a prism-shaped structure. The stop nut 121 has a tubular shape. The stop nut 121 forms a nut. The nut is defined elsewhere in this disclosure. The stop nut 121 screws onto the locking bolt 112 of the needle structure 101 such that the position of the stop nut 121 relative to the locking bolt 112 is adjustable. The stop nut 121 attaches the stop collar 102 to the needle structure 101.

The locking nut 103 screws onto the locking bolt 112 before the stop nut 121 such that the locking nut 103 prevents the stop nut 121 from screwing too far up the locking bolt 112 thereby fixing the position of the locking nut 103 relative to the needle structure 101. The procedure described in the previous sentence fixes the position of the locking nut 103 to a location between the stop nut 121 of the stop collar 102 and the wrench bit 113 of the needle structure 101. The position of the stop nut 121 sets the position of the stop flange 122 relative to the needle structure 101.

The stop flange 122 is a flange that is formed on a congruent end of the prism structure of the stop nut 121. The flange is defined elsewhere in this disclosure. The stop flange 122 is formed on the congruent end of the prism structure of the stop nut 121 that is distal from the locking nut 103. The stop flange 122 forms a barrier structure that presses against the damaged tire 105 such that the further penetration of the plug 106 needle 111 of the needle structure 101 into the damaged tire 105 is inhibited. The stop flange 122 limits the depth of penetration of the plug 106 needle 111 into the damaged tire 105 during the insertion of the plug 106.

The locking nut 103 is a prism-shaped structure. The locking nut 103 is a disk-shaped structure. The locking nut 103 has a nut structure. The locking nut 103 attaches to the needle structure 101 using a threaded connection. The locking nut 103 attaches to the needle structure 101 to form a composite prism structure. The locking nut 103 forms a locking structure that holds the stop collar 102 in a fixed position relative to the needle structure 101.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bolt: As used in this disclosure, a bolt is a cylindrical shaft that is formed with an exterior screw thread. A bolt is defined with an outer diameter.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Flange: As used in this disclosure, a flange is a protruding rib, edge, or collar that is used to hold an object in place or to attach a first object to a second object.

Flexible: As used in this disclosure, flexible refers to an object or material that will deform when a force is applied to it but that will not necessarily return to its original shape when the deforming force is removed.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Impact Wrench: As used in this disclosure, an impact wrench is a pneumatically powered mechanical device used to rotate a bit. The impact wrench is known for the ability to transfer high levels of torque to the bit. An impact wrench is also referred to as a pneumatic drill.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Lock: As used in this disclosure, a lock is a fastening device that fixes the position of a first object relative to a second object such that the first object and the second object are subsequently releasable.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Negative Space: As used in this disclosure, negative space is a method of defining an object through the use of open or empty space as the definition of the object itself, or, through the use of open or empty space to describe the boundaries of an object.

Nut: As used in this disclosure, a nut is a first object that is formed with a cylindrical negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Screw: As used in this disclosure, to screw is a verb meaning: 1) to fasten or unfasten (unscrew) a threaded connection; or 2) to attach a helical structure to a solid structure.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tire: As used in this disclosure, a tire is a solid or air filled covering for a wheel. The purpose of the tire is to absorb shocks, provide traction, and protect the wheel from wear and other damage.

Tool: As used in this disclosure, a tool is a device, an apparatus, or an instrument that is used to carry out an activity, operation, or procedure.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction. Wheels are often further defined with a rim and spokes. Spokes are also commonly referred to as a wheel disk.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 3 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A tire repair tool comprising
a needle structure, a stop collar, and a locking nut;
wherein the stop collar and the locking nut attach to the needle structure;
wherein the tire repair tool is configured for use with repairing a damaged tire of a vehicle;
wherein the tire repair tool is configured for use with an impact wrench that drives the working element of the tire repair tool into the damaged tire such that the tire repair tool can deposit a plug in an aperture formed through the damaged tire;
wherein the locking nut forms a locking structure that holds the stop collar in a fixed position relative to the needle structure;
wherein the needle structure comprises a plug needle, a locking bolt, and a wrench bit;
wherein the plug needle attaches to the locking bolt to form a composite prism structure;
wherein the locking bolt attaches to the wrench bit to form a composite prism structure.

2. The tire repair tool according to claim 1 wherein the stop collar limits the depth of insertion of the tire repair tool into the damaged tire;
wherein the locking nut fixes the position of the stop collar relative to the needle structure.

3. The tire repair tool according to claim 2
wherein the damaged tire is a tire that has been punctured;
wherein the plug is a flexible structure that is coated in an elastomeric material;
wherein the plug is compressed as it is inserted into the puncture of a damaged tire;
wherein the plug form as gas impermeable seal across the puncture.

4. The tire repair tool according to claim 3
wherein the needle structure is a mechanical structure;
wherein the needle structure has a composite prism structure;
wherein the needle structure installs the plug into the damaged tire.

5. The tire repair tool according to claim 4
wherein the needle structure attaches to the impact wrench such that the impact wrench drives the needle structure with the plug into the damaged tire;
wherein the needle structure leaves the plug in the damaged tire when the needle structure is removed from the damaged tire.

6. The tire repair tool according to claim 5
wherein the stop collar is a mechanical structure;
wherein the stop collar has a composite prism structure;
wherein the stop collar has a tubular structure;
wherein the stop collar has a nut structure.

7. The tire repair tool according to claim 6
wherein the stop collar attaches to the needle structure using a threaded connection;
wherein the stop collar attaches to the needle structure to form a composite prism structure;

wherein the stop collar forms a barrier that limits the depth of insertion of the needle structure into the damaged tire.

8. The tire repair tool according to claim 7
wherein the position of the stop collar relative to the needle structure is adjustable;
wherein the position of the stop collar on the needle structure controls the depth of insertion of the needle structure into the damaged tire.

9. The tire repair tool according to claim 8
wherein the locking nut is a prism-shaped structure;
wherein the locking nut is a disk-shaped structure;
wherein the locking nut has a nut structure.

10. The tire repair tool according to claim 9
wherein the locking nut attaches to the needle structure using a threaded connection;
wherein the locking nut attaches to the needle structure to form a composite prism structure.

11. The tire repair tool according to claim 10
wherein the stop collar comprises a stop nut and a stop flange;
wherein the stop nut attaches the stop collar to the needle structure;
wherein the stop flange is a flange that is formed on the stop nut.

12. The tire repair tool according to claim 11
wherein the plug needle is a mechanical device;
wherein the primary shape of the plug needle forms a prism-shaped structured;
wherein the plug needle is formed with a loop structure on one of the congruent ends of the prism structure of the plug needle;
wherein the loop formed in the plug needle is sized to receive the plug;
wherein the plug needle forms the working element of the needle structure;
wherein the plug needle forms the leading element of the needle structure;
wherein by leading element is meant that the plug needle leads the balance of the needle structure into the damaged tire when the needle structure inserts the plug into the damaged tire.

13. The tire repair tool according to claim 12
wherein the locking bolt is a prism-shaped structure;
wherein the locking bolt is formed as a bolt;
wherein the congruent end of the plug needle that is distal from the loop attaches to the locking bolt to form a composite prism structure;
wherein the outer dimension of the locking bolt is lesser than the outer dimension of the locking bolt;
wherein the locking bolt is formed with an exterior screw thread;
wherein the outer dimension of the locking bolt is lesser than the inner dimension of the locking nut such that the locking bolt will insert into the locking nut;
wherein the exterior screw thread of the locking bolt is sized such that the locking nut will screw on to the locking bolt to form a threaded connection;
wherein the outer dimension of the locking bolt is lesser than the inner dimension of the stop nut of the stop collar such that the locking bolt will insert into the stop nut of the stop collar;
wherein the exterior screw thread of the locking bolt is sized such that the stop nut of the stop collar will screw on to the locking bolt to form a threaded connection.

14. The tire repair tool according to claim 13
wherein the wrench bit is a prism-shaped structure;
wherein the congruent end of the locking bolt that is distal from the plug needle attaches to a congruent end of the prism structure of the wrench bit to form a composite prism structure;
wherein the wrench bit physically attaches the needle structure to the impact wrench such that the impact wrench will force the plug needle into the damaged tire.

15. The tire repair tool according to claim 14
wherein the stop nut is a prism-shaped structure;
wherein the stop nut has a tubular shape;
wherein the stop nut forms a nut.

16. The tire repair tool according to claim 15 wherein the stop nut screws onto the locking bolt of the needle structure such that the position of the stop nut relative to the locking bolt is adjustable.

17. The tire repair tool according to claim 16
wherein the locking nut screws onto the locking bolt before the stop nut such that the locking nut prevents the stop nut from screwing too far up the locking bolt thereby fixing the position of the locking nut relative to the needle structure;
wherein the position of the stop nut sets the position of the stop flange relative to the needle structure;
wherein the stop flange is a flange that is formed on a congruent end of the prism structure of the stop nut;
wherein the stop flange is formed on the congruent end of the prism structure of the stop nut that is distal from the locking nut;
wherein the stop flange forms a barrier structure that presses against the damaged tire such that the further penetration of the plug needle of the needle structure into the damaged tire is inhibited;
wherein the stop flange limits the depth of penetration of the plug needle into the damaged tire during the insertion of the plug.

* * * * *